(12) United States Patent
Stein et al.

(10) Patent No.: US 7,168,827 B2
(45) Date of Patent: Jan. 30, 2007

(54) SIDE EMITTER BEACON

(75) Inventors: Paul L. Stein, St. Peters, MO (US); David M. Dietrich, St. Peters, MO (US); Tim B. Murray, St. Louis, MO (US); Sarmad A. Hannosh, West Linn, OR (US); Richard Gray, Bridlington (GB)

(73) Assignee: Code 3, Inc., St. Louis, MO (US)

( * ) Notice: Subject to any disclaimer, the term of this patent is extended or adjusted under 35 U.S.C. 154(b) by 86 days.

(21) Appl. No.: 10/886,276

(22) Filed: Jul. 1, 2004

(65) Prior Publication Data

US 2005/0007784 A1     Jan. 13, 2005

Related U.S. Application Data

(60) Provisional application No. 60/485,911, filed on Jul. 9, 2003.

(51) Int. Cl.
*F21V 7/00*     (2006.01)
(52) U.S. Cl. .................... 362/299; 362/300; 362/800
(58) Field of Classification Search ........... 362/332, 362/373, 329, 346, 361, 343, 800, 328, 237, 362/241, 243, 245, 247, 477, 299, 493, 522, 362/542, 544, 545, 547, 546, 235, 297, 300, 362/301, 307, 310
See application file for complete search history.

(56) References Cited

U.S. PATENT DOCUMENTS

| | | | |
|---|---|---|---|
| 2,738,492 A | * | 3/1956 | Arneson et al. ............ 340/472 |
| 3,287,548 A | * | 11/1966 | Kompier .................... 362/542 |
| 3,784,809 A | | 1/1974 | Smith |
| 3,875,561 A | * | 4/1975 | Scarpino et al. ............ 340/472 |
| 4,142,179 A | * | 2/1979 | Lowndes .................... 340/321 |
| 4,425,604 A | * | 1/1984 | Imai et al. ................. 362/223 |
| 5,173,810 A | | 12/1992 | Yamakawa |
| 5,757,557 A | | 5/1998 | Medvedev et al. |
| 5,785,418 A | * | 7/1998 | Hochstein .................. 362/373 |
| 5,816,694 A | * | 10/1998 | Ideker et al. .............. 362/348 |
| 5,857,767 A | * | 1/1999 | Hochstein .................. 362/294 |
| 6,183,100 B1 | | 2/2001 | Suckow et al. |
| 6,464,373 B1 | | 10/2002 | Petrick |
| 6,543,911 B1 | | 4/2003 | Rizkin et al. |
| 6,552,658 B1 | | 4/2003 | Roller et al. |

FOREIGN PATENT DOCUMENTS

| | | |
|---|---|---|
| DE | 19728354 A1 | 1/1999 |
| EP | 1255306 A2 * | 6/2002 |
| WO | WO 03/048637 A1 | 6/2003 |

* cited by examiner

*Primary Examiner*—Sandra O'Shea
*Assistant Examiner*—Sharon Payne
(74) *Attorney, Agent, or Firm*—Senniger Powers

(57) ABSTRACT

A light source with an integral surface of revolution to project an emergency warning light signal for a vehicle in a substantially horizontal 360° arc. A centrally positioned mirror assembly has a plurality of light sources spaced about the mirror assembly.

27 Claims, 16 Drawing Sheets

SIDE EMITTER BEACON

FIELD OF THE INVENTION

This application generally relates to emergency lighting and in particular to an emergency warning light which employs a light source which emits a horizontal beam of light.

BACKGROUND OF THE INVENTION

In the past, many emergency warning lights have employed an omni-directional light source or a light source which generates a beam of light which is visible within in a particular limited, angular sector. For light sources which emit omni-directional light, a large amount of light is emitted upward or vertically providing little or no emergency warning value. On the other hand, a beam of light having a limited, angular sector of coverage generally needs to be rotated or oscillated in order to provide sufficient illumination which would amount to providing an emergency warning signal. There is a need for a simple configuration of an emergency warning light which primarily emits light in a substantially horizontal plane only.

BRIEF DESCRIPTION OF THE DRAWINGS

Corresponding reference characters indicate corresponding parts throughout the several views of the drawings.

DESCRIPTION OF THE INVENTION

Figure 1A:
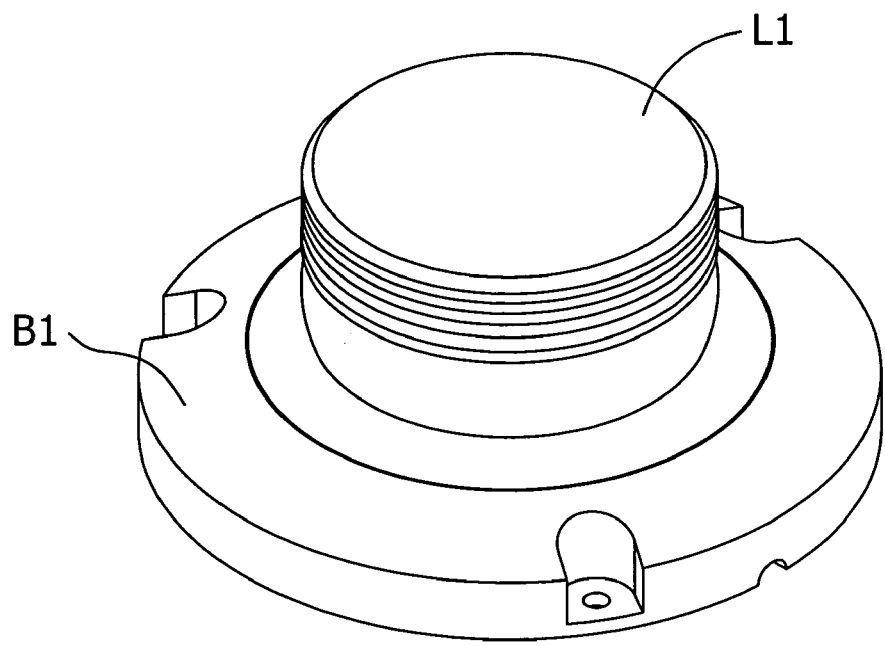
FIG. 1A is a perspective view of a lens L1 and base B1 for a first embodiment of the invention in which a single, side emitting LED (light emitting diode) is used.
Figure 1B:
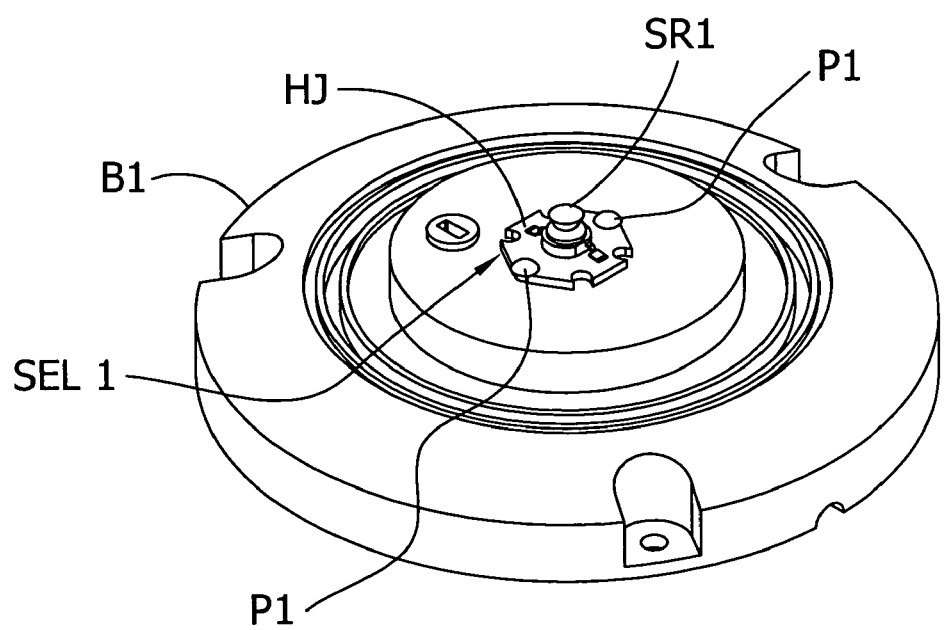
FIG. 1B is a perspective view of a base B1 for the first embodiment of the invention in which a single, side emitting LED SEL1 is used.
Figure 1D:
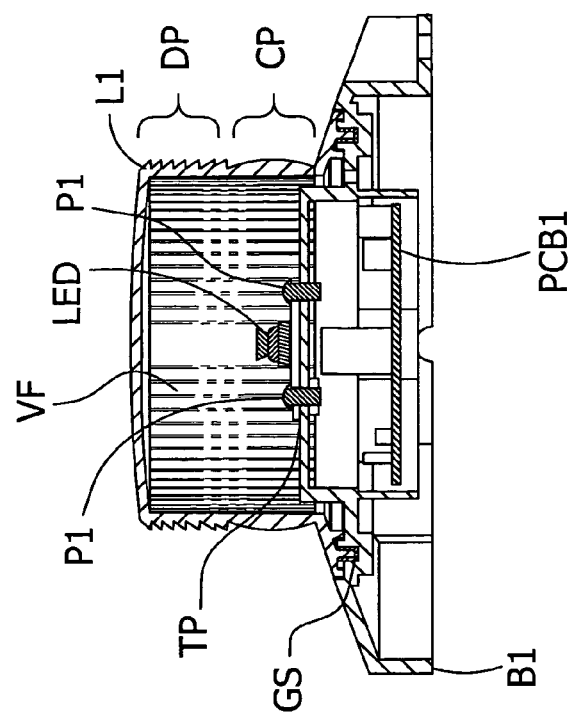
FIG. 1D is a cross-sectional view taken along lines 1D—1D of FIG. 1C of the lens L1 and base B1 of FIG. 1A.
Figure 1C:
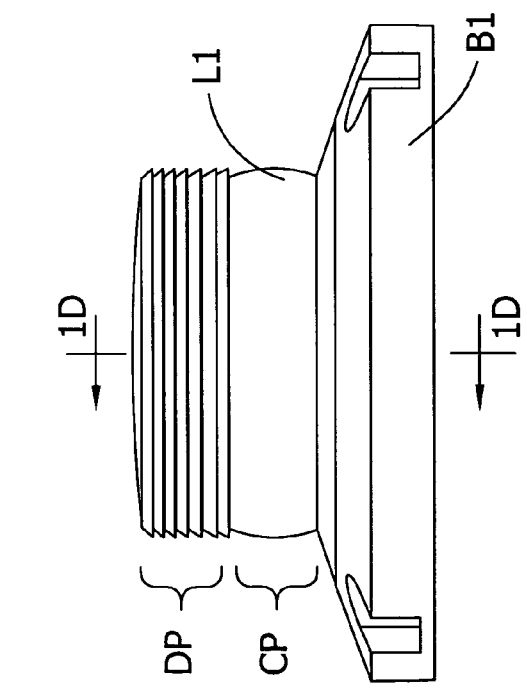
FIG. 1C is a side elevation view of the lens L1 and base B1 of FIG. 1A.
Figure 1E:
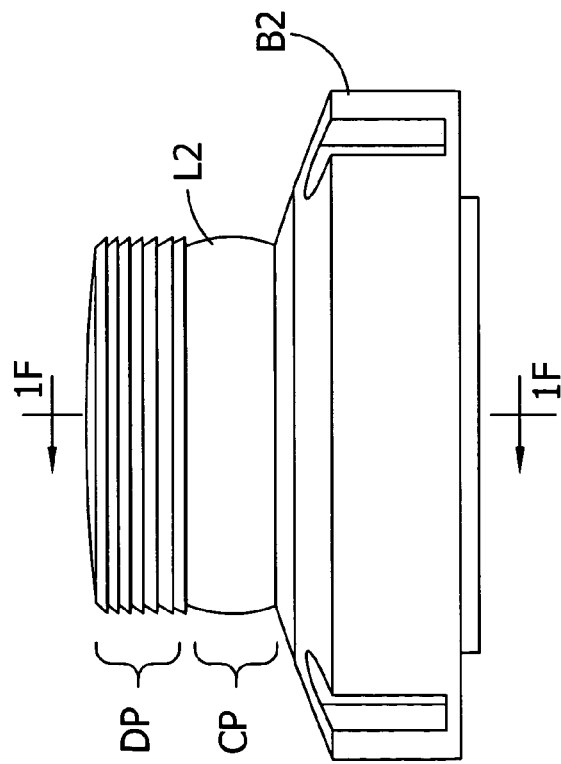
FIG. 1E is a side elevation view of a lens L2 and base B2 of a second embodiment of the invention, in which a single, side emitting LED is used.
Figure 1F:
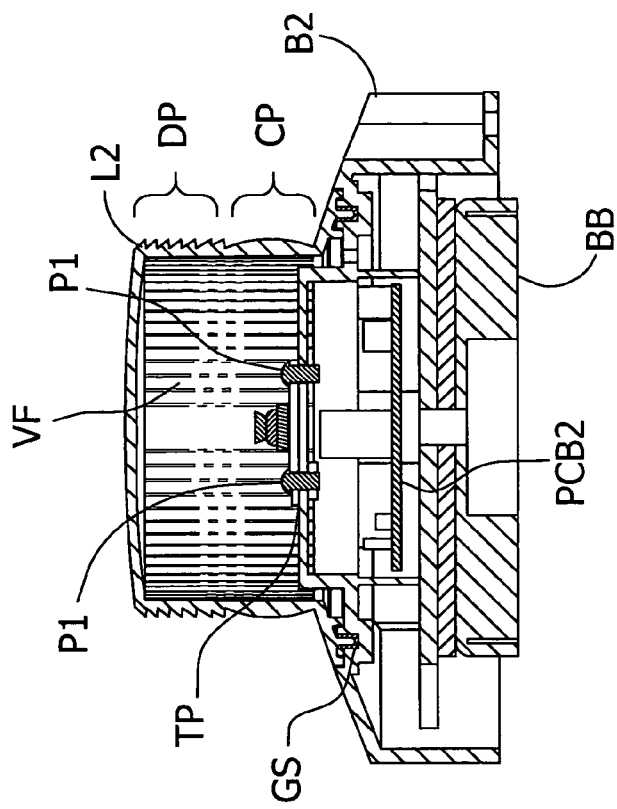
FIG. 1F is a cross-sectional view taken along line 1F—1F of FIG. 1E of the lens L2 of FIG. 1E assembled with the base B2 of the second embodiment.
Figure 1G:
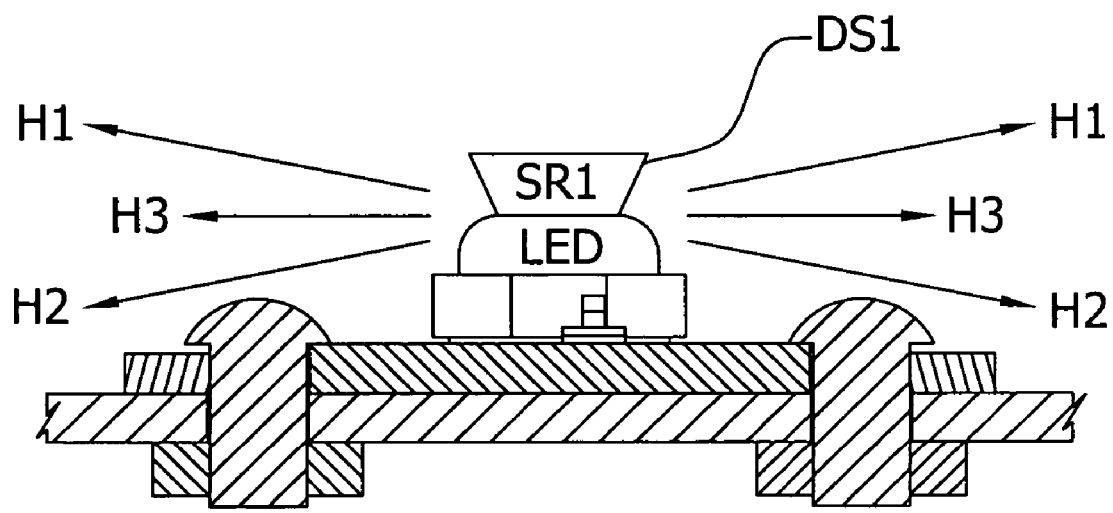
FIG. 1G is a detailed view of the side emitting light source of the first and second embodiments including an LED and a surface of revolution SR1.

Referring to FIGS. 1A–1G, one preferred embodiment of the invention is illustrated. In particular, FIG. 1A is a perspective view of a lens L1 for a first embodiment of the invention in which a single, side emitting LED is used. FIG. 1B is a perspective view of the base B1 for a first embodiment of the invention in which the single, side emitting LED SEL1 is illustrated. A side view of this first embodiment is illustrated in FIG. 1C and a cross-sectional view is illustrated in FIG. 1D. In general, this light according to the invention includes a base B1 and a light source SEL1 supported by the base. In general, the light source SEL1 includes an LED which emits at least a substantially horizontal beam of light and at least a substantially vertical beam of light. A surface of revolution SR1 is positioned over and integral with the LED such that the vertical beam is directed substantially parallel to the horizontal beam of light that is emitted by the LED. FIG. 1G illustrates this aspect wherein light radiated by the LED is horizontally directed by the surface SR1 into horizontal beams of light Hi and H2 having about a 20 degree spread, although other spreads are contemplated. It is contemplated that surface SR1 may direct or re-direct light by transmission, reflection, refraction, diffusion or any other type of optical directing so that the resulting light is substantially horizontal. In addition, the LEDs may emit horizontal beams of light H3 without such beams intersecting or otherwise being involved with the surface SR1.

As noted above, the LED and SR1 may be an integral unit in the form of a side emitting LED such as a LUXEON™ STAR manufactured and sold by LUMILEDS™. In one form, such side emitting LEDs are manufactured and sold in combination with a heat junction HJ upon which the LED is mounted to dissipate the heat generated by the LED. In this configuration, the base B1 functions as a heat sink and is in contact with the heat junction HJ with a layer of thermal paste TP or other heat conducting material between the two surfaces. The side emitting LED may be fixed to the base B1 by any engagement means such as pins P1 as shown in FIG. 1D.

As illustrated in FIGS. 1A–1G, the surface of revolution SR1 has an inverted conical shape which, in one of its simplest forms, may be generated by revolving an inverted right triangle about a vertical axis parallel to one of the legs of the triangle. This conical surface of revolution SR1 has a linear directive surface DS1. It is also contemplated that any of the surfaces of revolution herein may have a directive surface DS1 that is a parabolic surface, an elliptical surface, a hyperbolic surface or other surface which may or may not be a fluted surface.

The lens L1 engages the base and encloses the side emitting LED SEL1 including its surface of revolution SR1. The lens L1 has a convex portion CP in the same plane as the substantially horizontal plane in which the light is emitted by the LED SEL1. The convex portion CP further focuses the light in this horizontal plane. The lens L1 also has a di-optic portion DP adjacent to the convex portion CP which directs any light not within the substantially horizontal plane of light emitted by the LED SEL1 into the horizontal plane or a parallel horizontal plane. The convex portion CP and the di-optic portion DP cause the light to appear taller to the observer. The inside surface of the lens L1 has vertical flutes VF to make the light appear wider to the observer. The combined effect of the vertical flutes VF, convex portion CP, and di-optic portion DP of the lens. L1 is to make the light appear to be larger and rectangular to the observer. Without these features of the lens L1, the light tends to appear to be a point source to an observer.

The lens L1 and base B1 may be joined by any method or structure. In one embodiment, a series of grooves GS in the base B1 are filled with an epoxy or other potting compound and mated to the corresponding ribs in the mounting surface of the lens L1. This protects the LED SEL1 under the lens L1 from moisture, weather and other elements. In general, the side emitting LED or the lens or both may be colored or clear.

In general, it is contemplated that the light would include means for engaging a vehicle so that the light would provide an emergency warning signal for the vehicle. As illustrated in FIGS. 1B and 1F, the light is provided with insets for engaging screws which may assist in the mounting of the light to a vehicle or which may be mounted to a mount which could be attached to the vehicle, such as by suction cups, magnets, adhesive pads or other well known techniques for supporting the light on the vehicle. In one embodiment, a permanent magnet BB is positioned within the base B2 as shown in FIGS. 1E–1F for magnetic engagement to a metallic surface, such as a vehicle body.

As illustrated in FIG. 1D, the light includes a printed circuit board PCB1 adapted to engage a power source via a power cable (not shown). The board PCB1 is positioned within and supported by the base B1 and may be encapsulated in a weather resistant material such as a potting material, an epoxy material, a silicone material or any other material that would resist or inhibit moisture or other weather created conditions from significantly affecting the board's operation. The board is electrically connected to the LED for selectively energizing the LED when engaging a power source. This selective energization of the LED may include flashing according to a preprogrammed or manually implemented program or continuous illumination.

One aspect of the invention is that virtually all light is either directly emitted or directed into a substantially horizontal plane as a warning to observers so that substantially no light fails to warn an observer. The horizontal plane of light generally would provide an emergency warning signal to most observers in the horizontal plane surrounding the light.

Figure 2A:
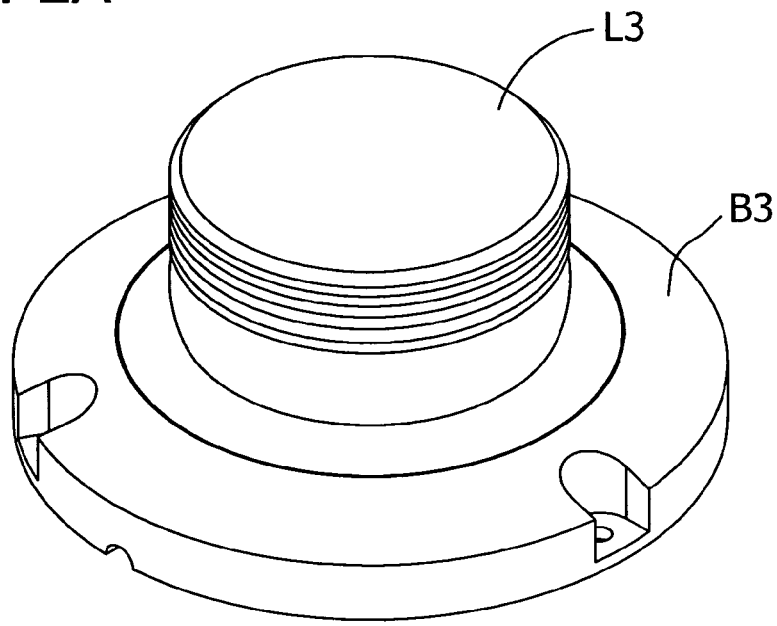
FIG. 2A is a perspective view of a lens L3 and base B3, similar to the lens L1 and base B1 of FIG. 1A, for a third embodiment of the invention in which three side emitting LEDs (SEL1, SEL2, SEL3) and a hexagonal reflective surface HRS are used.
Figure 2B:
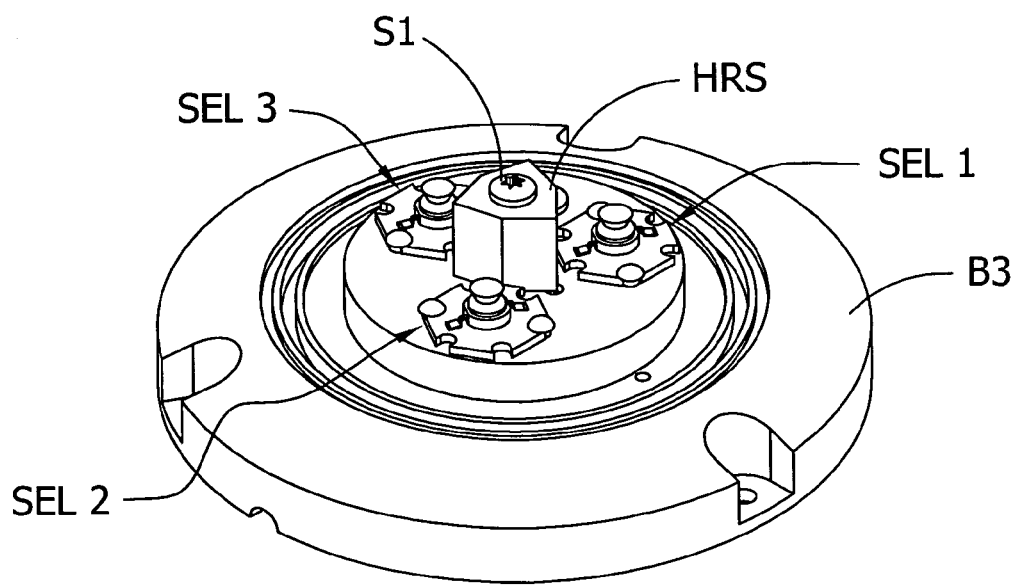
FIG. 2B is a perspective view of a base B3 for the third embodiment of the invention in which three side emitting LEDs (SEL1, SEL2, SEL3) and a hexagonal reflective surface HRS are used.
Figure 2C:
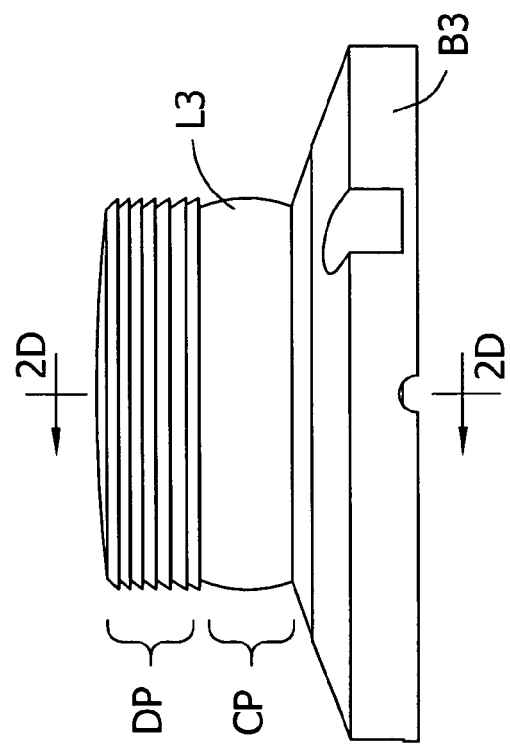
FIG. 2C is a side elevation view of the lens L3 and base B3 of FIG. 2A.
Figure 2D:
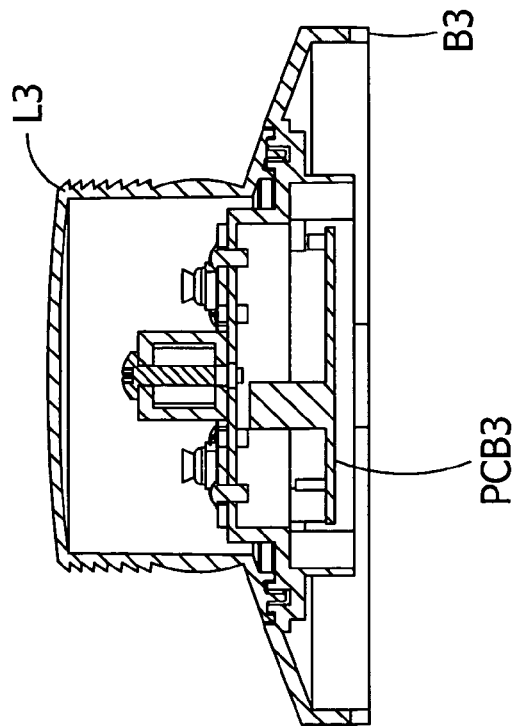
FIG. 2D is a cross-sectional view taken along lines 2D—2D of FIG. 2C of the lens L3 of FIG. 2A assembled with the base B3 of FIG. 2B of the third embodiment.
Figure 2F:
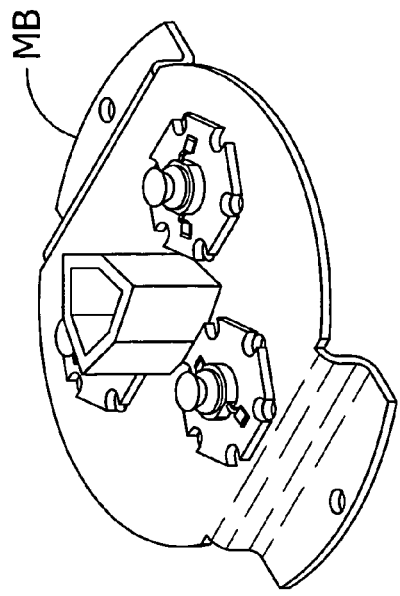
FIG. 2F is a perspective view of the mounting bracket MB of FIG. 2E.
Figure 2H:
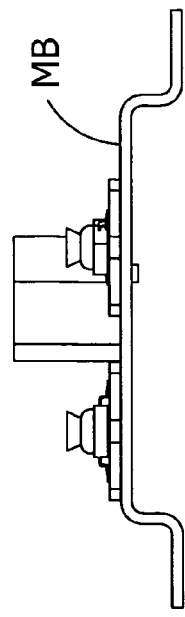
FIG. 2H is a front view of the mounting bracket MB of FIG. 2E.
Figure 2E:
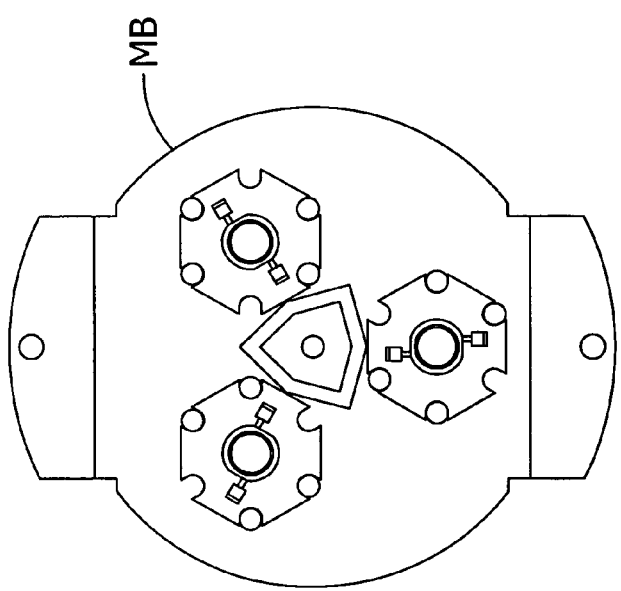
FIG. 2E is a top plan view of a mounting bracket MB which may be used to support the three side emitting LEDs and the hexagonal reflective surface HRS of a fourth embodiment.
Figure 2G:
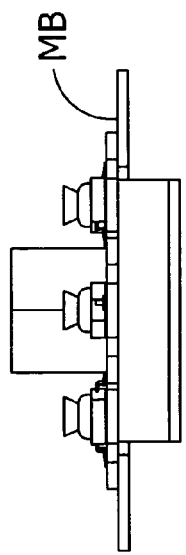
FIG. 2G is a side view of the mounting bracket MB of FIG. 2E.

FIGS. 2A–2I illustrate another preferred embodiment according to the invention. FIG. 2A is a perspective view of a lens L3 similar to the lens L1 of FIG. 1A, for a third embodiment of the invention in which three side emitting LEDs SEL1, SEL2, SEL3 are used.

In the embodiment of FIGS. 2A–2I, a mounting bracket MB or other base B3 supports a plurality of side emitting light sources SEL1, SEL2 and SEL3 which together emit a substantially horizontal beam of light. A hexagonal reflective surface HRS is fixed to the base B3 by a screw S1 and positioned between the light sources for reflecting the horizontal beam of light such that the reflected light is substantially parallel to the horizontal beam of light emitted by the light sources themselves. Thus, as in the previous embodiment, essentially no light fails to warn an observer and substantially all light is used to generate an emergency warning signal.

Figure 2I:
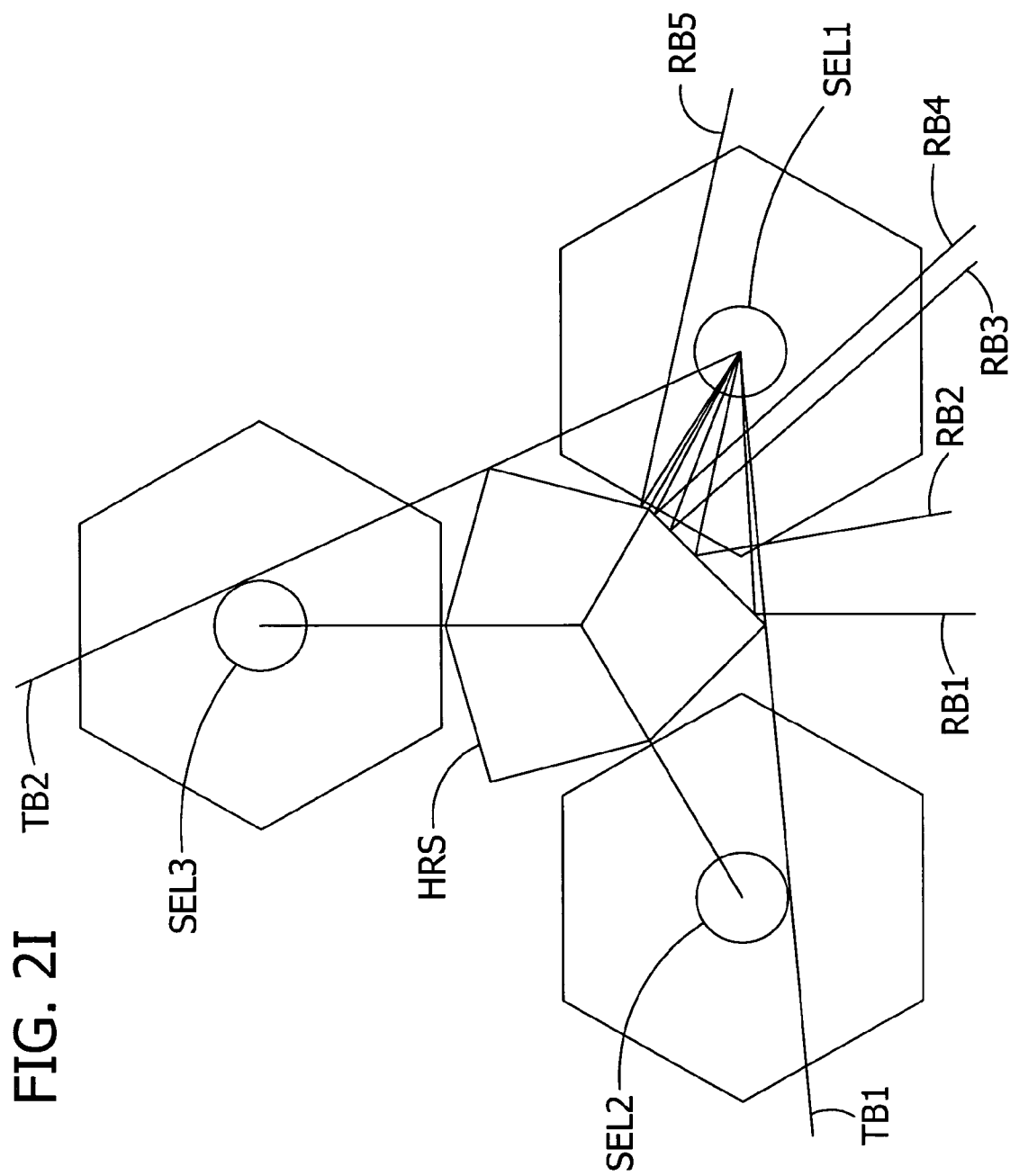
FIG. 2I is a schematic diagram of a top plan view of the three side emitting LEDs (SEL1, SEL2, SEL3) and hexagonal reflective surface HRS of FIGS. 2A–2H illustrating the angles of the hexagonal reflective surface HRS and illustrating the positioning of the side emitting LEDS relative to transmitted beams TB and reflected beams RB1–RB4 of light, according to the third and fourth embodiments.

As shown in FIG. 2I, each surface of the hexagonal reflective surface HRS is positioned at an angle with respect to at least one of the side emitting light sources such that substantially all the light directed inwardly toward each surface is reflected outwardly away from the surface. The outwardly reflected light does not intersect and is not blocked by any of the plurality of side emitting light sources. In particular, it is noted that inwardly reflecting beams RB1 and RB2 are reflected by the surface and do not intersect the light source SEL1. Similarly, reflecting beams RB3 and RB4 which are much closer to the source SEL1 are also reflected but do not intersect the source. Reflected beam RB5 is reflected on the other side of the source that is immediately adjacent the surface reflecting beam RB4 so that substantially all light directed inwardly by the light source is reflected outwardly. In addition, it is noted that transmitted beam TB1 and TB2 which are transmitted past the corner of the surfaces do not intersect the other light sources SEL2 and SEL3 so that substantially all transmitted light from the light sources is converted into an emergency warning light within the horizontal plane. In other words, a light beam such as beams RB1–RB5 from a particular side emitting light source such as SEL1 directed toward the center of the light are each reflected back past the particular side emitting light source without substantially intersecting a particular side emitting light source. In addition, a light beam from a particular side emitting light source such as SEL1 directed past a vertical edge of the reflective surface such as beams TB1 and TB2 do not substantially intersect any of the plurality of side emitting light sources so that these light beams are also effectively used for emergency signaling. It is contemplated that one or more side emitting LEDs (not shown) could be mounted on top of the hexagonal reflecting surface HRS and used to create another plane of substantially horizontal light, or adapted to substantially direct light into the same horizontal plane as the other side emitting LEDs SEL1–SEL3.

As illustrated in FIGS. 2A–2I, one preferred embodiment of the reflective surface contemplates that the surface comprises pairs (e.g., three) of flat mirrors, each pair having edges engaging one of the edges of the other adjacent pairs (e.g., the other two pairs). In certain pair configurations, the flat mirrors of a pair may be substantially perpendicular to each other. The mirror pairs may also be interconnected and made from a single block of material such that the mirror pairs can be attached to the base with a single screw, pin, or other means of attachment. In one embodiment, the mirror assembly is made from a single piece of polished metal and attached to the base B3 by a screw S1. The light sources illustrated in FIGS. 2A–2I include a light emitting diode having an integral surface of revolution thereon. Such devices are mounted on a heat junction HJ which in turn is mounted on a heat sink such as the base B3, MB. Lens L3 engages the base B3 and encloses the light source and the surface of revolution. A printed circuit board PCB3 is mounted within the base. FIGS. 2E–2H illustrate an alternative embodiment according to the invention wherein the light sources and reflective surface are mounted on a mounting bracket MB which engages a base similar to the base B3. In this configuration, the printed circuit board PCB3 is mounted under the bracket and engages the base. Also, in this configuration it is noted that the base has a higher vertical profile than the base B3 of FIGS. 2A–2D.

Figure 3A:
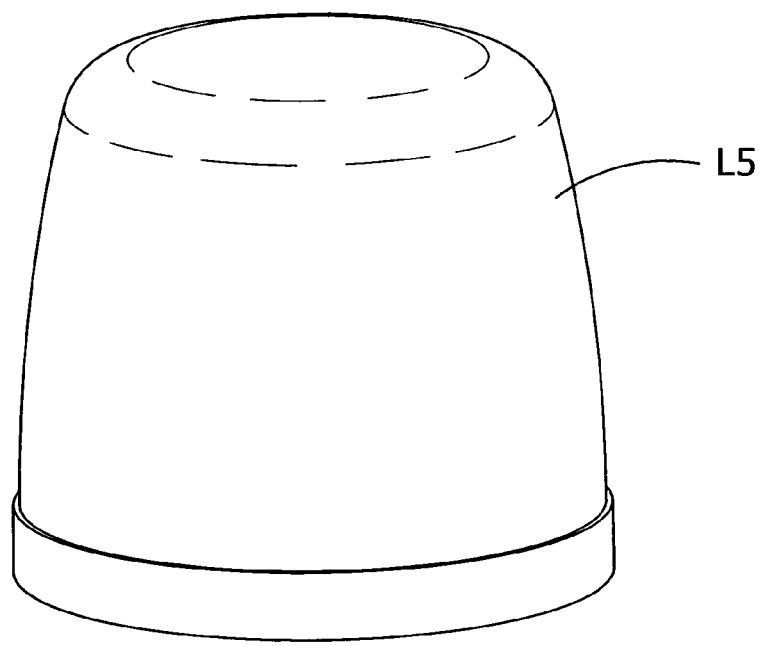
FIG. 3A is a perspective view of a lens L5 for a fifth embodiment of the invention in which six upwardly directed LEDs (LED1–LED6) are used.
Figure 3B:
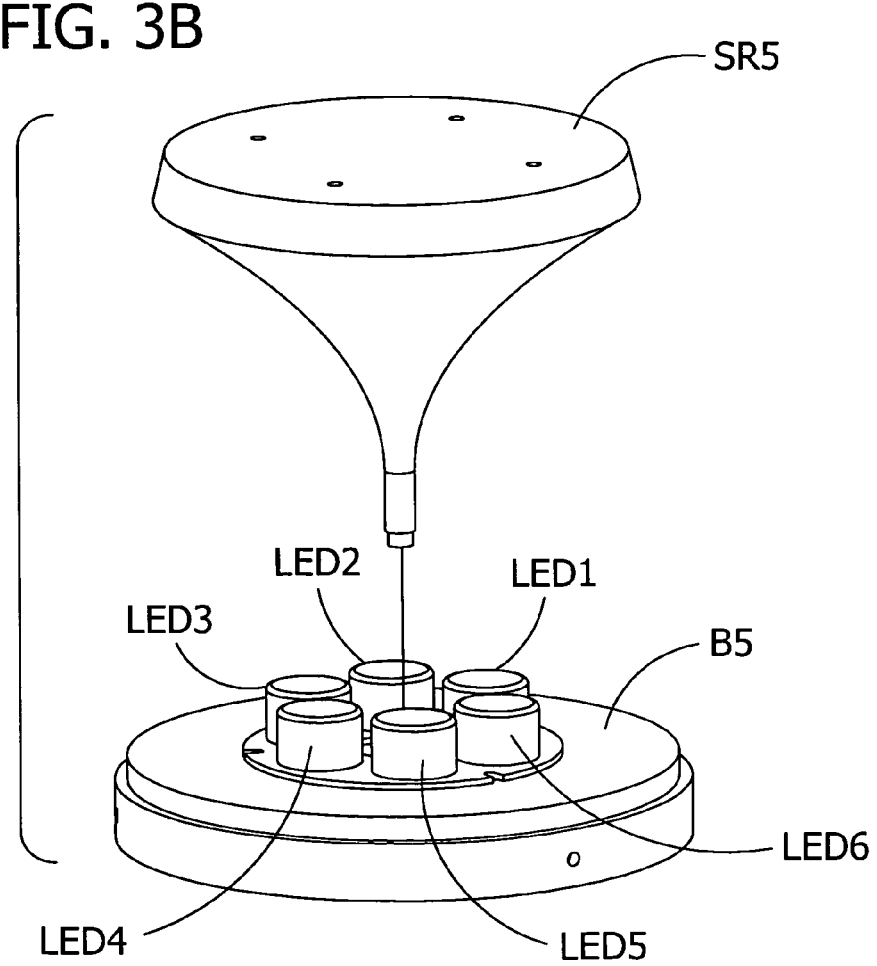
FIG. 3B is a perspective view of a base B5 for the fifth embodiment of the invention in which six LEDs and a surface of revolution SR5 are used.
Figure 3C:
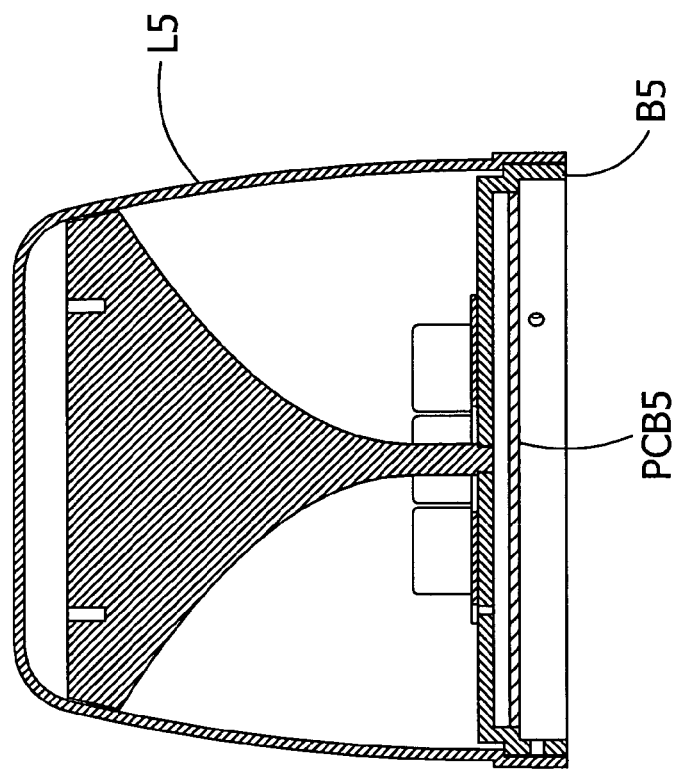
FIG. 3C is a side elevation view of the lens L5 of FIG. 3A.
Figure 3D:
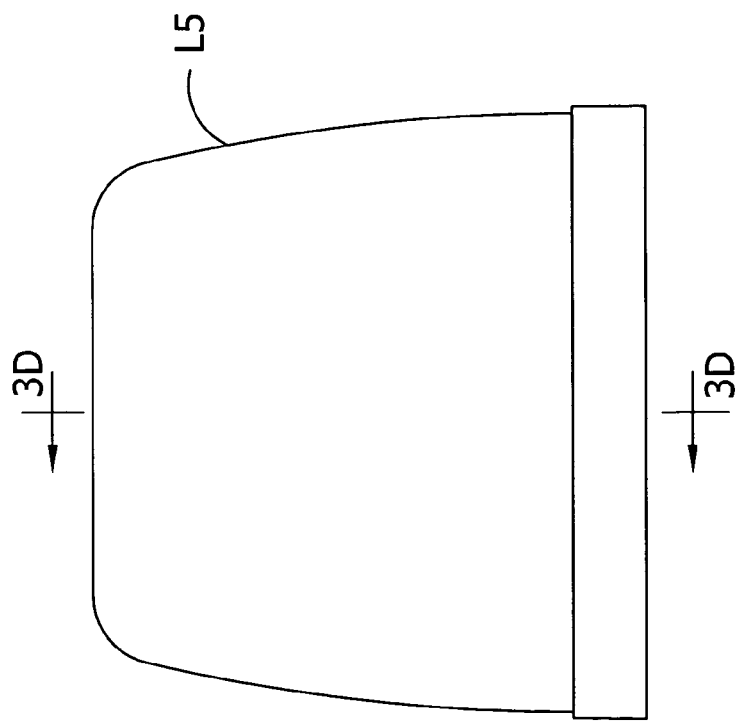
FIG. 3D is a cross-sectional view taken along lines 3D—3D of FIG. 3C of the lens L5 of FIG. 3A assembled with the base B5 of FIG. 3B.
Figure 10:
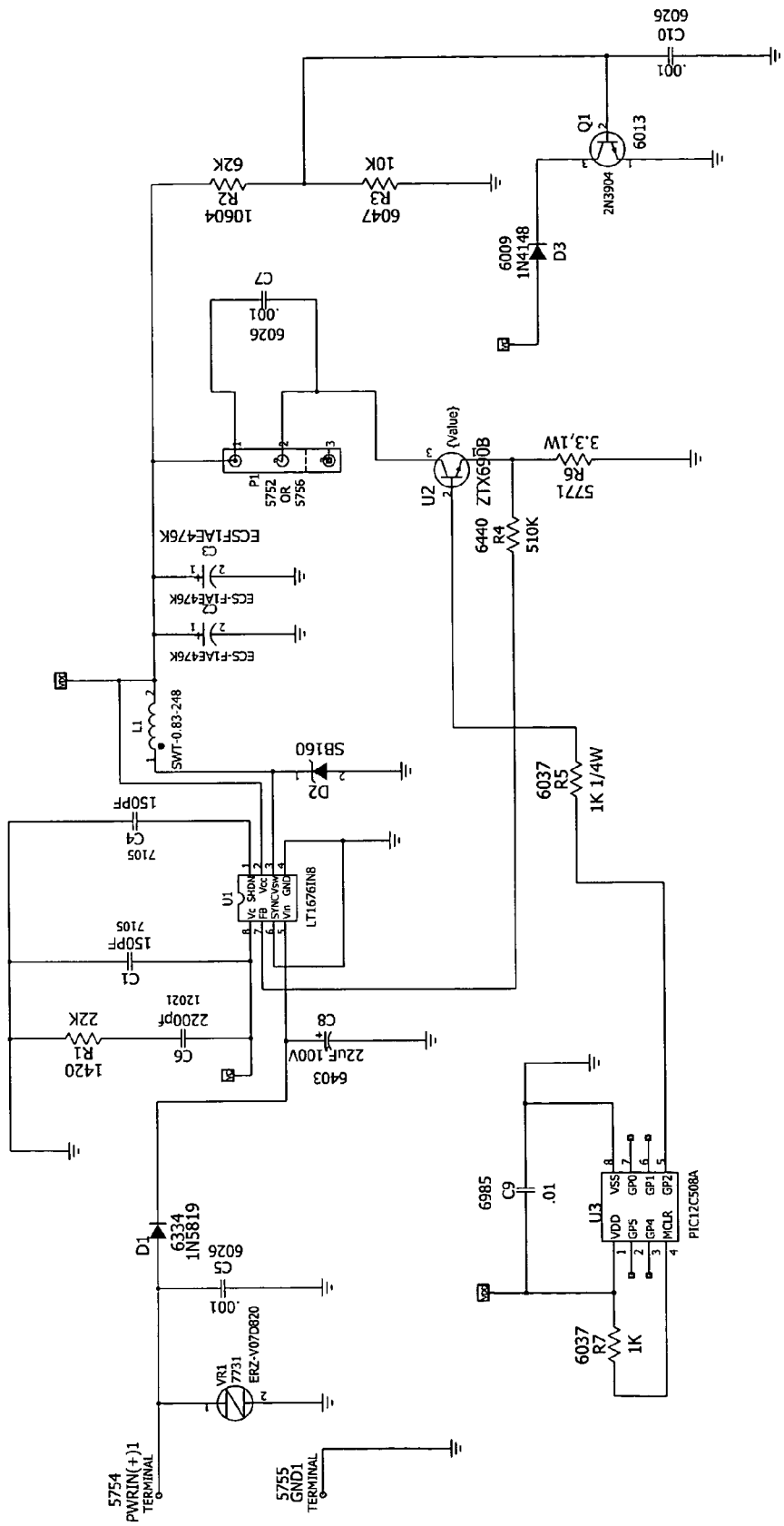
FIG. 10 is a schematic of a driver circuit of the invention where the frequency and duty cycle of the light source are determined by a micro controller.

Referring to FIGS. 3A–3D, a fifth embodiment of the invention is illustrated. FIG. 3C is an elevated side view and FIG. 3A is a perspective view of a lens L5 for the fifth embodiment which includes six LEDs, L1–L6 as shown in greater detail in FIG. 3B. Each of the light emitting diodes is supported by a base B5 and emits a substantially vertical beam of light. A surface of revolution SR5 is positioned over the lights and between the lights for directing the vertical beams of light such that the directed beam is substantially horizontal. The LEDs L1–L6 are arranged in a circular pattern on the base and the directive surface is a surface of revolution revolved around an axis such that the surface of revolution is positioned above the LEDs and the axis is oriented substantially vertically and positioned centrally within the circular pattern. A printed circuit board may be mounted within the base such as illustrated by printed circuit board PCB5 in FIG. 3D. One specific embodiment of a schematic of a printed circuit board is illustrated in FIG. 10. The LEDs illustrated in FIG. 3C may be a LUXEON™ RING manufactured by LUMILEDS™.

Figure 5:
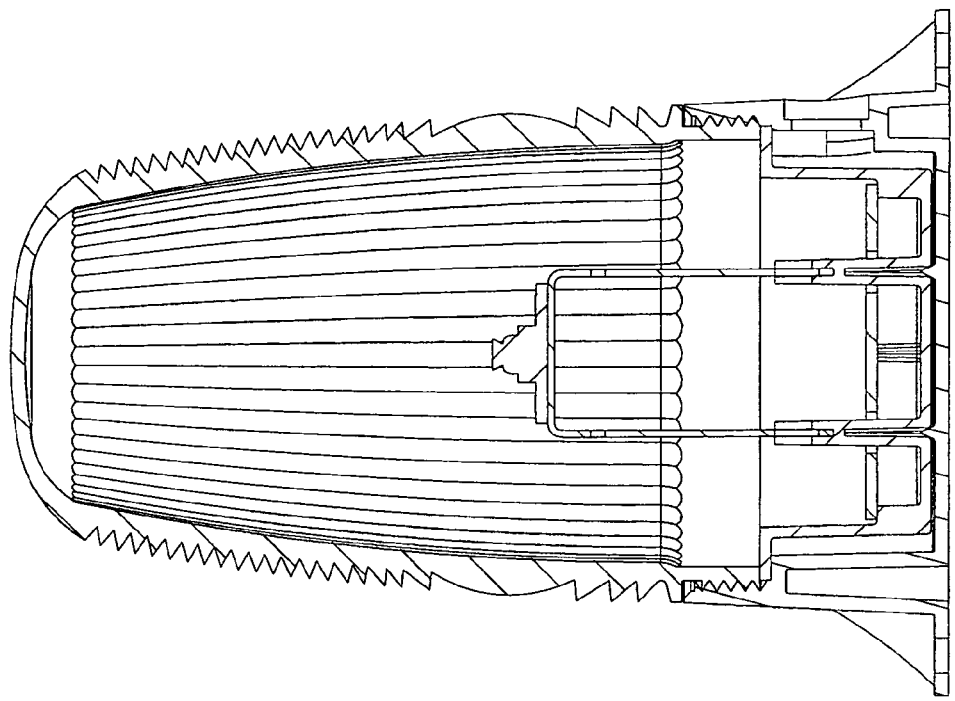
FIGS. 4–9 illustrate an alternative embodiment according to the invention in the form of a module which fits into different lens housings for vehicles such as lift trucks or tractors.
Figure 4:
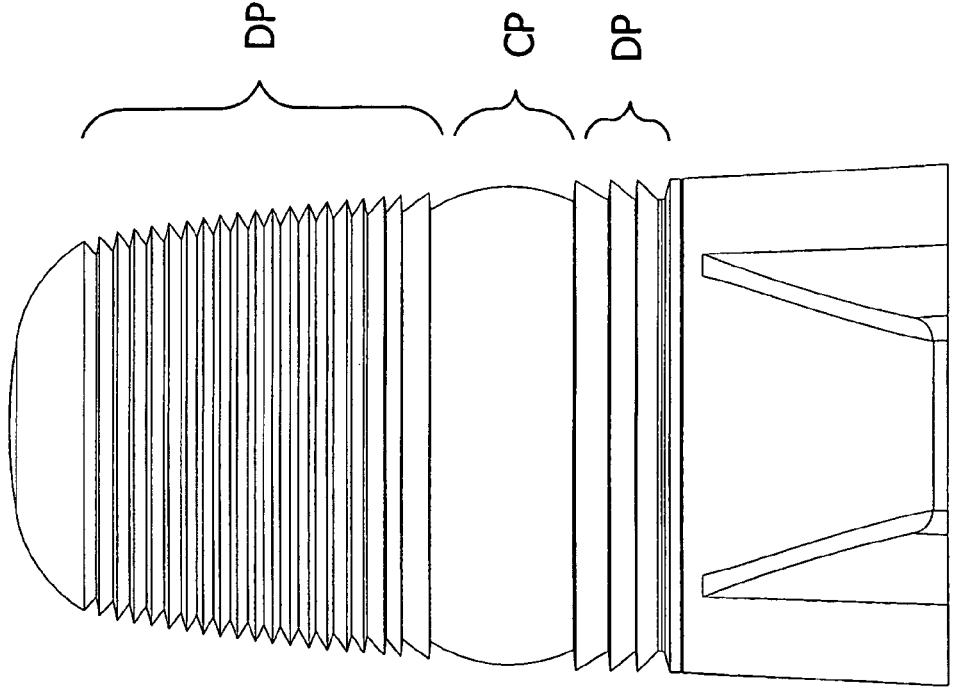
Figure 7:
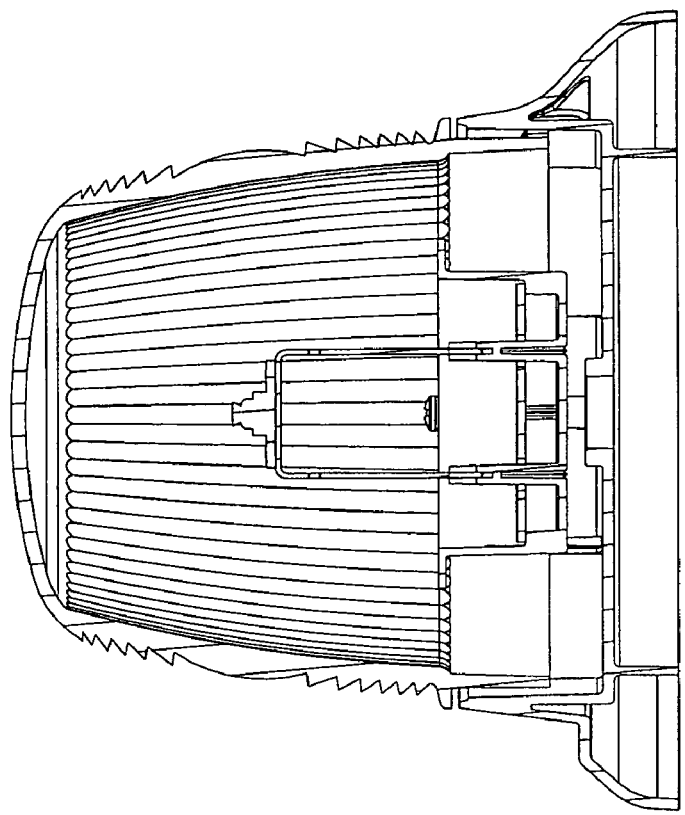
Figure 6:
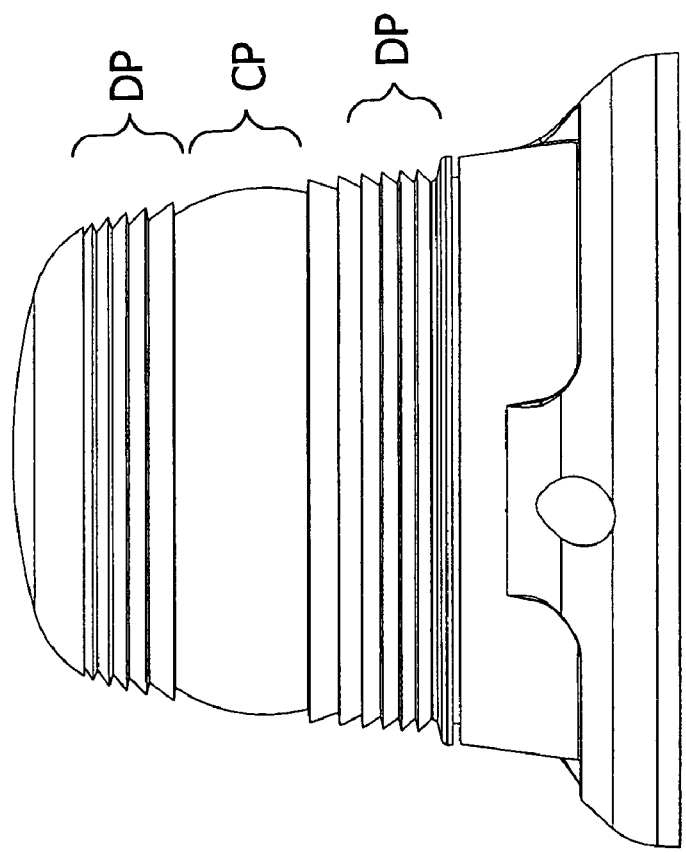
Figure 9:
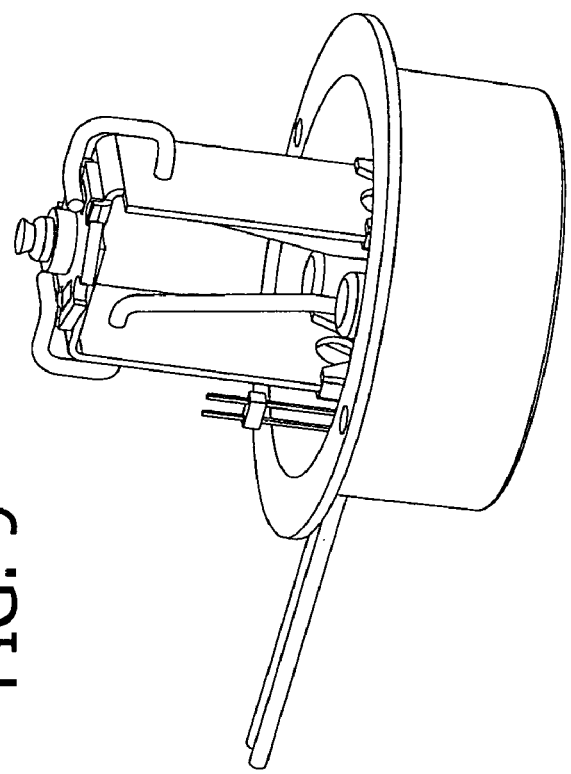
Figure 8:
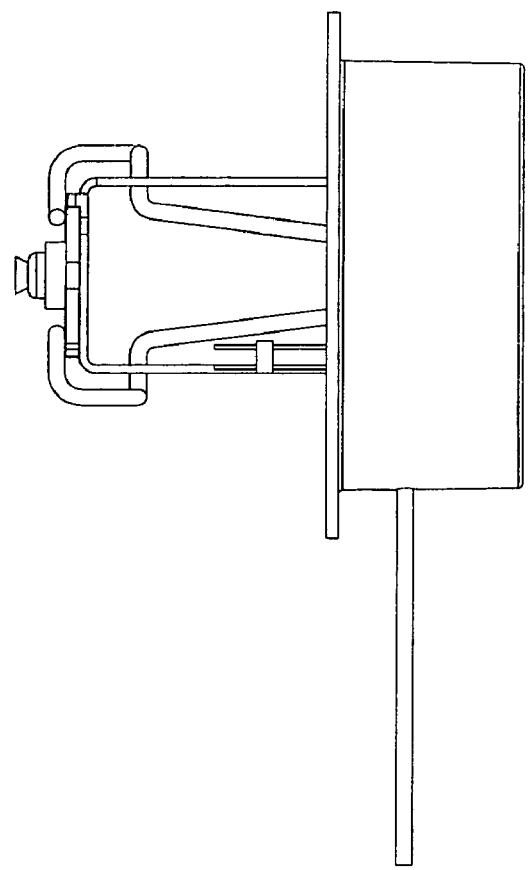

FIGS. 4 to 9 illustrate a family of embodiments. FIG. 8 shows an elevated side view of a bracket module supporting a platform on top of which there is a side emitting LED. This module also contains the driver circuit for the LED. FIG. 9 shows a perspective view of this same module. This module is made to fit into a number of lenses or housings to meet different specifications. FIG. 4 shows one housing embodiment and FIG. 5 shows a cross section of that housing with the module of FIG. 8–9 fit into it. FIG. 6 shows a housing that meets European DIN 14620 size standards for warning beacons, and FIG. 7 shows a cross section of that housing with the module of FIGS. 8–9 fit into it. The embodiments of FIGS. 4–9 include convex and di-optic portions similar to the convex portion CP and di-optic portion DP of the lens L1 in FIG. 1D. In addition, an additional di-optic portion is illustrated below the convex portion of the housing. Other housings can be made to meet different or changing size specifications, while utilizing this same internal module in those new housings.

Referring to FIG. 10, a schematic diagram of a circuit of a printed circuit board of the invention for powering a single LED is illustrated. Those skilled in the art will understand that this circuit may be modified to power multiple LEDs or that multiple circuits, one for each LED, may be employed for embodiments of the invention which have more than one LED. A power source, such as a 12 vdc vehicle battery is connected to terminals PWRIN(+)1 and GND1. After transient clamping and filtering, the voltage is applied to switching regulator U1 which steps down the DC volts to about 4.2 vdc to be applied to the LED via pins P1 and P2 of the connector. The LED is powered in a constant current mode (approx. 375 milliamps). Feedback via resistor R4 is provided to the switching regulator U1 as a gain control to vary the PWM duty cycle of the regulator to maintain constant current. Switch Q2 limits the output voltage if no LED is connected to the circuit to avoid U1 operating in a runaway mode in which U1 attempts to constantly increase the current. Q2 indicates to U1 to skip PWM adjustment cycles when no LED is connected to the circuit to avoid runaway operation. Programmable microcontroller U3 controls bipolar transistor U2 to control the flash pattern of the LED, turning it on and off.

Figure 11:
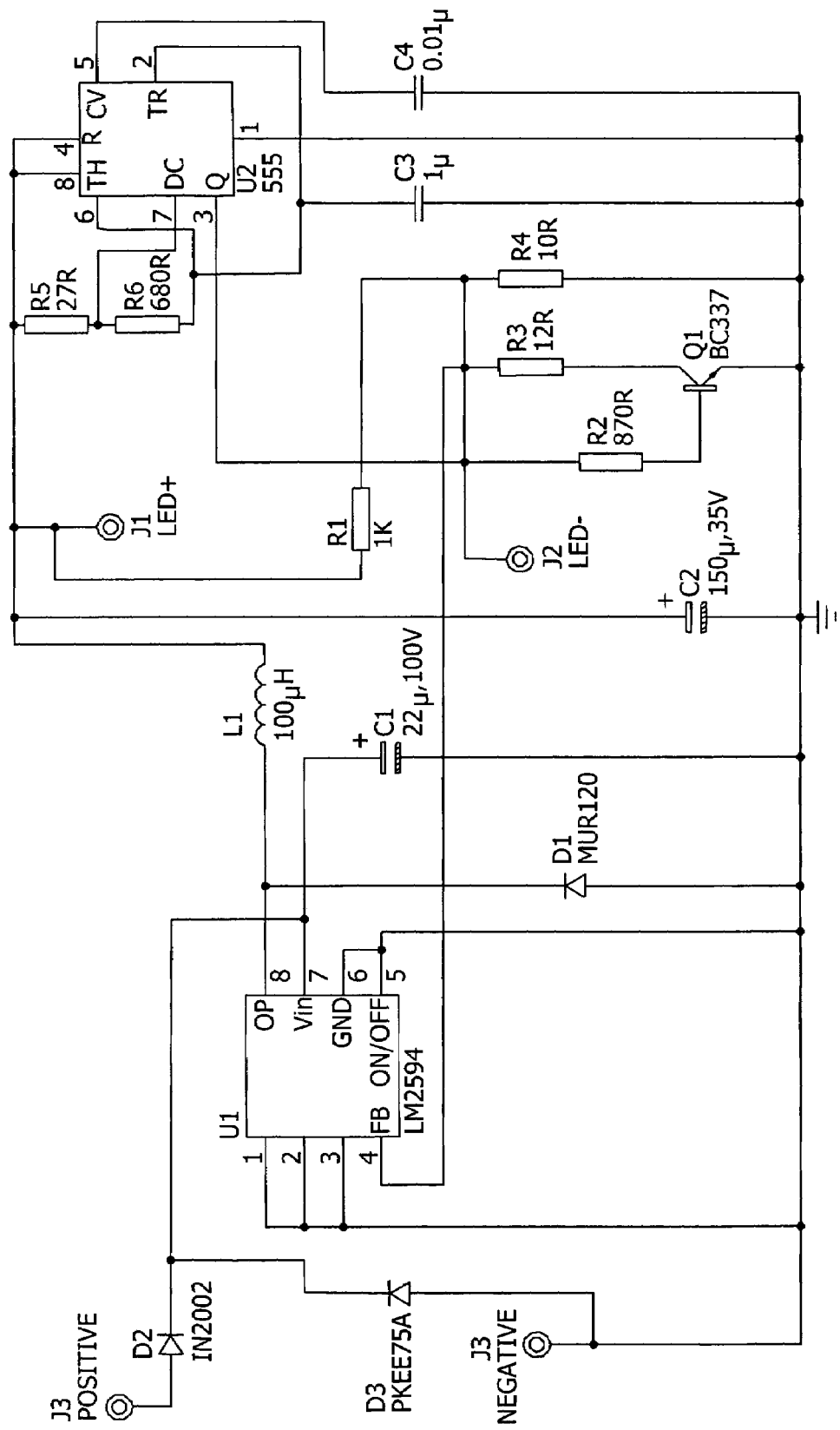
FIG. 11 is a schematic of a driver circuit of the invention where the frequency and duty cycle of the light source are determined by a resistor and capacitor circuit.

Referring to FIG. 11, a power source of between 10 and 60V dc is connected to the input terminals J3 (+) and J4 (−), D2 then provides reverse polarity protection and D3 provides transient voltage protection. The voltage is then applied to the switching regulator U1, the feedback pin of which is connected to the junction between R1, R3, R4 and the LED cathode thus providing a fixed 5V output at this point. With the LED switched off the voltage at the feedback pin FB is maintained at 5V by raising the output voltage of U1 sufficiently to maintain 5V in the center of the resistor divider network created by R1 and R4. When the transistor Q1 is switched on resistor R3 is connected to ground, in order to maintain the feedback pin at 5V the output voltage from U1 is increased until the voltage across R1 and hence the LED is sufficient to allow the LED to conduct, the LED is therefore energized at a constant current determined by the value of R3.

Timer IC, U2, controls the transistor Q1 to control the flash pattern, the frequency and duty cycle being determined by R5, R6 and C3.

Figure 12:
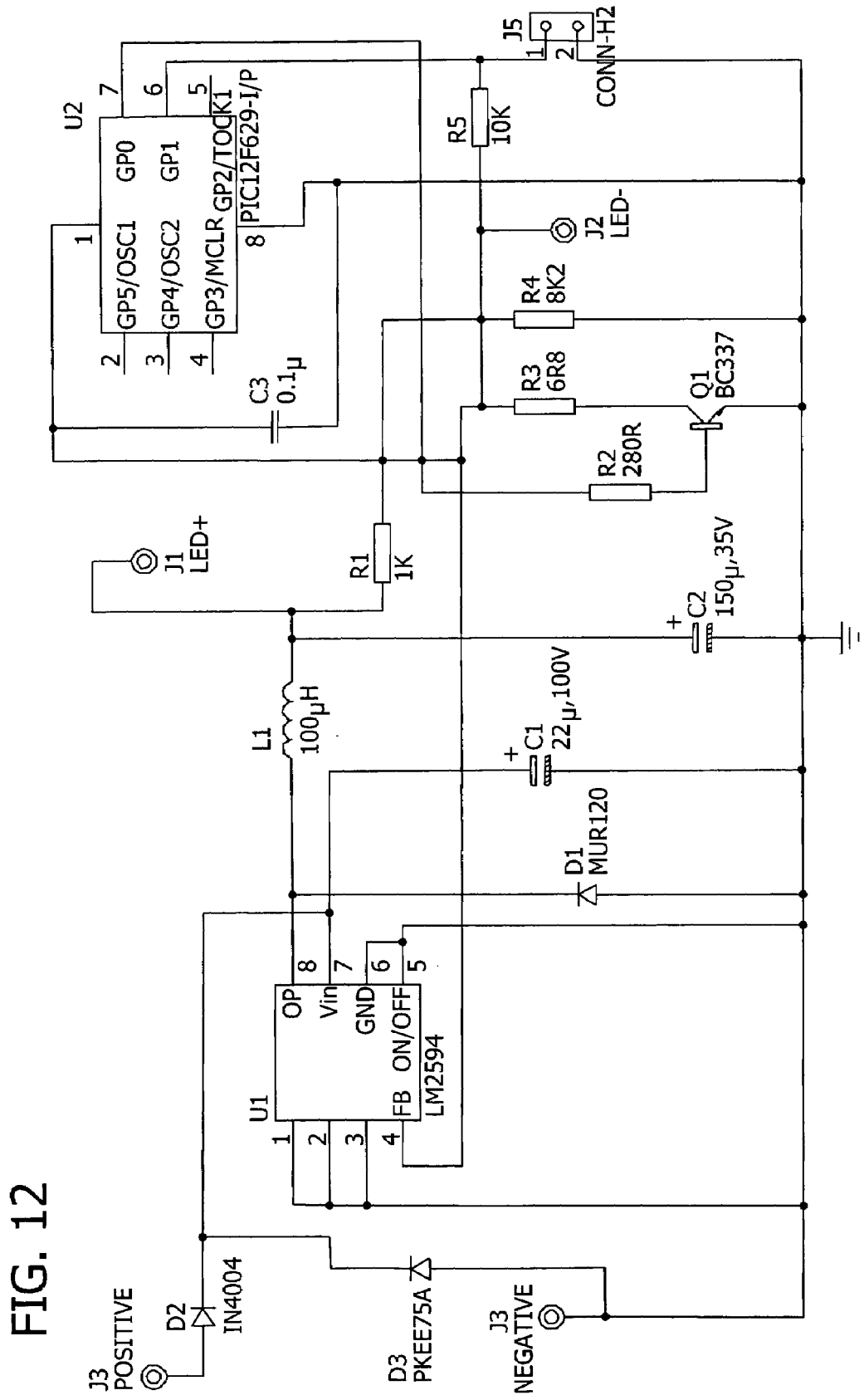
FIG. 12 is a schematic of a driver circuit of the invention where the frequency and duty cycle of the light source are controlled by a micro controller and may be selected by the user from a number of preprogrammed patterns.

Referring to FIG. 12, a power source of between 10 and 60V dc is connected to the input terminals J3 (+) and J4 (−), D2 then provides reverse polarity protection and D3 provides transient voltage protection. The voltage is then applied to the switching regulator U1, the feedback pin FB of which is connected to the junction between R1, R3, R4 and the LED cathode thus providing a fixed 3.3V output at this point. With the LED switched off the voltage at the feedback pin is maintained at 3.3V by raising the output voltage of U1 sufficiently to maintain 3.3V in the center of the resistor divider network created by R1 and R4. When the transistor Q1 is switched on resistor R3 is connected to ground, in order to maintain the feedback pin at 3.3V the output voltage from U1 is increased until the voltage across R1 and hence the LED is sufficient to allow the LED to conduct, the LED is therefore energized at a constant current determined by the value of R3.

Programmable micro-controller, U2, controls the transistor Q1 to control the flash pattern, two terminals at J5 are provided for the end user to "short together" in order to select a flash pattern from a number of pre-programmed alternatives.

When introducing elements of the present invention of the preferred embodiments thereof, the articles "a", "an", "the" and "said" are intended to mean that there are one or more of the elements. The terms "comprising", "including" and "having" are intended to be inclusive and meant that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A light comprising:
   a base;
   a light source supported by the base, said light source emitting at least a substantially horizontal beam of light transverse to a substantially vertical axis and emitting at least a substantially vertical beam of light along the substantially vertical axis;
   a surface of revolution having a central axis substantially collinear with the substantially vertical axis, said surface of revolution positioned over the light source for directing the vertical beam of light such that the directed beam is substantially horizontal wherein said surface of revolution has a curved directive surface and a top not forming a directive surface;
   a lens engaging the base and enclosing the light source and the surface of revolution; and
   means on the base for engaging a vehicle whereby the light provides an emergency warning signal.

2. The light of claim 1 wherein the directive surface of the surface of revolution comprises a parabolic surface, an elliptical surface, a hyperbolic surface and/or a fluted surface.

3. The light of claim 1 further comprising at least one of:
   a printed circuit board adapted to engage a power source, said board positioned within and supported by the base and electrically connected to the light source for selectively energizing the light source when engaging a power source;
   a printed circuit board adapted to engage a power source, said board positioned within and supported by the base and electrically connected to the light source for selectively energizing the light source when engaging a power source, wherein the printed circuit board is encapsulated in a weather resistant material; and
   a flash circuit adapted to engage a power source, said circuit electrically connected to the light source for selectively energizing the light source.

4. A light comprising:
   a base;
   a plurality of side emitting light sources supported by the base, said light sources emitting a substantially horizontal beam of light; and
   a reflective surface positioned between the light sources for reflecting the horizontal beam of light such that the reflected beam is substantially horizontal, wherein the reflective surface is positioned at an angle with respect to at least one of the side emitting light sources such that substantially all light directed inwardly toward the reflective surface is reflected outwardly away from the reflected surface and the outwardly reflected light does not intersect any of the plurality of side emitting light sources.

5. The light of claim 4 wherein a light beam from a particular side emitting light source directed toward the center is reflected back past the particular side emitting light source without substantially intersecting the particular side emitting light source.

6. The light of claim 4 wherein a light beam from a particular side emitting light source directed toward the center is reflected back past the particular side emitting light source without substantially intersecting the particular side emitting light source.

7. The light of claim 4 wherein a light beam from a particular side emitting light source directed past a vertical edge of the reflective surface does not substantially intersect any of the plurality of side emitting light sources.

8. The light of claim 4 wherein the reflective surface comprises pairs of flat mirrors, each pair having edges engaging one of the edges of the other adjacent pairs.

9. The light of claim 4 wherein the reflective surface comprises three pairs of flat mirrors, each pair having edges engaging one of the edges of the other two pairs, wherein the flat mirrors of a pair are substantially perpendicular to each other.

10. The light of claim 9 wherein the reflective surface comprises a single piece of polished metal.

11. The light of claim 4 wherein the light source is a light emitting diode (LED) and wherein a surface of revolution is integral with the LED.

12. The light of claim 11 wherein the LED comprises a side emitting LED.

13. The light of claim 11 wherein the base comprises a heat sink and wherein the LED is mounted on the heat sink.

14. The light of claim 11 wherein the LED is mounted on a heat junction and wherein the heat junction is supported by and engages the base.

15. The light of claim 4 wherein the reflective surface comprises a parabolic surface, an elliptical surface, a hyperbolic surface and/or a fluted surface.

16. The light of claim 4 farther comprising a lens engaging the base and enclosing the light source and a surface of revolution.

17. The light of claim 4 including means for engaging a vehicle whereby the light provides an emergency warning signal.

18. The light of claim 4 further comprising a printed circuit board adapted to engage a power source, said board positioned within and supported by the base and electrically connected to the light source for selectively energizing the light source when engaging a power source.

19. The light of claim 18 wherein the printed circuit board is encapsulated in a weather resistant material.

20. The light of claim 4 including a flash mode selection circuit having conductors projecting from a potting compound or other weather resistant encapsulating material.

21. The light of claim 20 wherein the selection circuit includes a storage device having a plurality of pre-programmed light patterns and wherein, when a voltage is applied to the conductors, the circuit mode scrolls to and operates according to the next pre-programmed pattern.

22. A light comprising:
   a base;
   a light source supported by the base, said light source emitting at least a substantially horizontal beam of light transverse to a substantially vertical axis and emitting at least a substantially vertical beam of light along the substantially vertical axis;
   a surface of revolution having a central axis substantially collinear with the substantially vertical axis, said surface of revolution positioned over the light source for directing the vertical beam of light such that the directed beam is substantially horizontal wherein said surface of revolution is integral with the light source, has a linear directive surface, and has a side forming the linear directive surface;

a lens engaging the base and enclosing the light source and the surface of revolution; and means on the base for engaging a vehicle whereby the light provides an emergency warning signal.

23. The light of claim 22 further comprising at least one of:

a printed circuit board adapted to engage a power source, said board positioned within and supported by the base and electrically connected to the light source for selectively energizing the light source when engaging a power source;

a printed circuit board adapted to engage a power source, said board positioned within and supported by the base and electrically connected to the light source for selectively energizing the light source when engaging a power source, wherein the printed circuit board is encapsulated in a weather resistant material; and a flash circuit adapted to engage a power source, said circuit electrically connected to the light source for selectively energizing the light source.

24. The light of claim 22 wherein the light source is a light emitting diode (LED) and wherein the surface of revolution is integral with the LED.

25. The light of claim 24 wherein the LED and the integral surface comprise a side emitting LED.

26. The light of claim 25 wherein the base comprises a heat sink and wherein the LED is mounted on the heat sink.

27. The light of claim 25 wherein the LED is mounted on a heat junction and wherein the heat junction is supported by and engages the base.

* * * * *